UNITED STATES PATENT OFFICE.

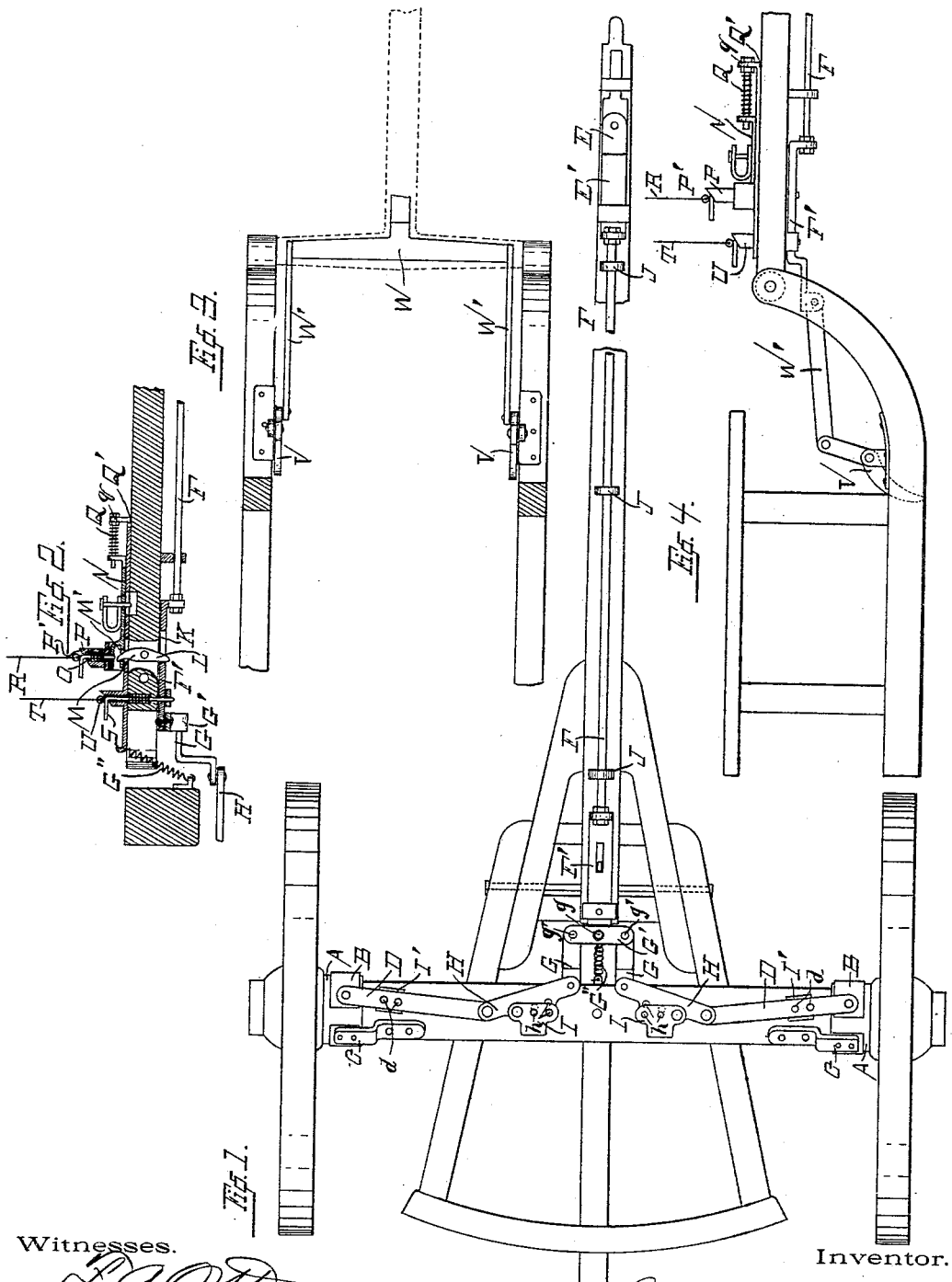

ANTON KNUTSEN, OF MADISON, WISCONSIN.

VEHICLE-BRAKE.

SPECIFICATION forming part of Letters Patent No. 618,106, dated January 24, 1899.

Application filed October 28, 1897. Renewed December 20, 1898. Serial No. 699,872. (No model.)

*To all whom it may concern:*

Be it known that I, ANTON KNUTSEN, a citizen of the United States, residing at Madison, in the county of Dane and State of Wisconsin, have invented new and useful Improvements in Vehicle Brake Mechanism, of which the following is a specification.

My invention relates to improvements in vehicle brake mechanisms, with especial reference to that class of brake mechanisms in which the force exerted by the horses is applied to operate the brakes.

The objects of my invention are, first, to provide improved mechanism whereby the brakes can be operated normally from the neck-yoke; second, to provide mechanism whereby the brakes may be operated temporarily from the whiffletrees or eveners; third, to provide for adjusting the brake mechanism to regulate the pressure of the brakes, and, fourth, to provide for locking the brake mechanism and releasing the same from the vehicle-seat.

In the following description reference is had to the accompanying drawings, in which—

Figure 1 is a plan of my invention as viewed from the under side. Fig. 2 is a detail section view drawn on the axis of the tongue. Fig. 3 is a detail view showing the connecting mechanism for applying the brake to the runners of the sleigh. Fig. 4 is a side view of the same with a portion of the rear end of the tongue.

Like parts are identified by the same reference-letters throughout the several views.

When applied to wheeled vehicles, the vehicle-hub is provided with a metallic thimble-bearing A, encircled by a strip or band brake B, of spring-steel or equivalent material, one end of which is rigidly engaged by a bracket C, while the other end is attached to the brake-actuating lever D. Motion is communicated to apply the brakes from the neck-yoke-engaging lug or hook E through the sliding flat bar E', rod F, plate F', equalizing-bar G', arms G G, intermediate levers H H, and brake-actuating levers D D, the levers being fulcrumed, respectively, on brackets I and I', attached to the under side of the axle, and the rod F being supported in guides J, attached to the under side of the tongue. The brackets I and levers H are provided with several holes $h\,h$, in which the fulcrum-pin of the lever H is adapted to engage, thus providing for adjusting the parts to increase or diminish the leverage. The levers D and brackets I' are similarly provided with the holes $d\,d$ for adjusting the leverage of the lever D, the object of such adjustment being to regulate the pressure of the brake. The bar G' is pivoted at $g$ to the plate F' and at $g'\,g'$ to the arms G G, thus equalizing the pressure of the respective brakes.

G'' is a tongue-supporting spring connecting the rear end of the tongue with the vehicle-axle.

For use in case of an emergency, such as a runaway or a necessity for a sudden stop, the plate F' is provided with a slot K, into which a lever L engages, said lever being provided with a hook M on its upper end, which is engaged in a slot M' in the sliding plate N, to which the evener is attached, so that the forward movement of the evener-plate is communicated to the plate F' and the brakes through the lever L. O is a spring-actuated stop-pin projecting through a fixed sleeve-bracket P, attached to the tongue and registering in a hole in the plate N to prevent the brake from being normally set by the draft upon the evener. As the upper end P' of the sleeve P is eccentrically formed, it is evident that by either rotating the pin in the sleeve or by drawing it upwardly it will be withdrawn from its engagement with the evener-plate and permit the latter to move forwardly and set the brakes. The stop-pin is rotated in the sleeve whenever it is desired to set the brakes from the evener for a considerable period—for example, when breaking or training horses; but in case of an emergency the pin can be instantly withdrawn by means of a wire R, which is attached to the pin O and connected with the vehicle-seat. Q is a spring for retracting the evener-plate when the draft upon the evener ceases, and Q' is a fixed plate upon which the evener-plate slides, with an upwardly-bent end $q$, adapted to limit the forward movement of the evener-plate if the brake mechanism should yield or give way. When it is desired to back the vehicle, the entire mechanism may be locked by a similarly-constructed spring-actuated stop-pin S, engaged in an aperture in the plate F' and which is also connected to the vehicle-seat by a wire T. This pin is normally disengaged from the plate F', being supported in that position by its bearing in the eccentric-sleeve U.

It will be observed that with the above-described construction the brakes can be operated by the force applied to the neck-yoke, the lever H H being actuated to draw the band around the hub-thimble, while the reaction of the spring metal of which the brake is composed will automatically release the hub as soon as the backward pull upon the neck-yoke ceases. The brakes can also be set by the draft upon the eveners by releasing the stop-pin O to permit the evener-plate to actuate the lever L.

Referring now to Figs. 3 and 4, it will be observed that the same mechanism may be used with slight alterations upon sleighs, the hooked brake-levers V being connected with the sliding brake-setting mechanism of the tongue by means of a cross-bar W and rods W', with the levers D and H of the wagon-brake omitted.

Having thus described my invention, what I claim as new, and desire to secure by Letters Patent, is—

1. In a brake mechanism, the combination of a set of band-brakes rigidly connected at one end to the vehicle-axle, a lever fulcrumed to the vehicle-axle and connected with the movable end of each of said band-brakes, a longitudinally-movable rod secured to the under side of the tongue and adapted to be connected with the neck-yoke, an equalizing-bar pivotally connected with the rear end of said rod, and connections between said bar and the brake-actuating levers, substantially as described.

2. In a brake mechanism, the combination of a set of band-brakes rigidly connected at one end to the vehicle-axle, a lever fulcrumed to the vehicle-axle and connected with the movable end of each of the band-brakes, a longitudinally-movable rod secured to the under side of the tongue and adapted to be connected with the neck-yoke, a flat plate or bar slidably secured on the under side of the tongue at the rear end thereof and connected with said rod, an equalizing-bar pivotally secured to said plate, and arms pivotally secured to the outer ends of the equalizing-bar, with the other ends of said arms connected with the brake-levers, substantially as described.

3. In a brake mechanism, the combination of a set of band-brakes rigidly connected at one end to the vehicle-axle, a lever fulcrumed to the vehicle-axle and connected with the movable end of each of the band-brakes, a longitudinally-movable rod secured to the under side of the tongue and adapted to be connected with the neck-yoke, arms and intermediate connecting-levers adapted to communicate the motion of said rod to the brake-levers, together with means for adjusting the levers to increase or decrease their purchase.

4. In a brake mechanism, the combination of a set of band-brakes rigidly connected at one end to the vehicle-axle, a lever fulcrumed to the vehicle-axle and connected with the movable end of each of said band-brakes, a longitudinally-movable rod secured to the under side of the tongue and adapted to be connected with the neck-yoke, connections between the rod and the brake-actuating levers, and connections for temporarily communicating motion from the evener to the said rod to retract the latter, whereby the brakes may be applied from the neck-yoke and also from the evener, in case of an emergency, substantially as described.

5. In a brake mechanism, the combination with the brakes, of a longitudinally-movable tongue-rod connected therewith and adapted to actuate the same, means for engaging the neck-yoke at the forward end of the tongue-rod, a slidable evener-holding plate secured to the upper side of the tongue, a lever connecting said plate with the tongue-rod and provided with an intermediate fulcrum, and a stop-pin for temporarily holding said plate in a fixed position, substantially as described.

6. In a brake mechanism, the combination with the brakes, of a longitudinally-movable tongue-rod connected therewith and adapted to actuate the same, means for engaging the neck-yoke at the forward end of the tongue-rod, a slidable evener-holding plate secured to the upper side of the tongue, a spring for retracting said plate, and a stop for limiting its forward movement, a lever connecting said plate with the tongue and provided with an intermediate fulcrum, and a stop-pin for temporarily holding said plate in a fixed position, substantially as described.

7. In a brake mechanism, the combination with the brakes, of a longitudinally-movable tongue-rod connected therewith and adapted to actuate the same, means for engaging the neck-yoke at the forward end of the tongue-rod, and a slidable evener-holding plate secured to the upper side of the tongue, a lever connecting said plate with the tongue and provided with an intermediate fulcrum, a spring-actuated stop-pin for temporarily holding said plate in a fixed position, and a second spring-actuated stop-pin for temporarily locking the tongue-rod in a fixed position, said stop-pins being located in eccentrically-formed sleeves, whereby the rotation of the pins in their respective sleeves is adapted to withdraw them from their engagement with the parts held, substantially as described.

8. In a brake mechanism, the combination with the brakes, of a longitudinally-movable tongue-rod connected therewith and adapted to actuate the same, means for engaging the neck-yoke at the forward end of the tongue-rod, a slidable evener-holding plate secured to the upper side of the tongue, a lever connecting said plate with the tongue and provided with an intermediate fulcrum, and a stop-pin for temporarily holding said plate in a fixed position, together with means for actuating said stop-pin from the vehicle-seat, substantially as described.

In testimony whereof I affix my signature in the presence of two witnesses.

ANTON KNUTSEN.

Witnesses:
LAWRENCE B. MURPHY,
F. L. GILBERT.